United States Patent
Sato

(10) Patent No.: US 10,108,826 B1
(45) Date of Patent: Oct. 23, 2018

(54) NON-CONTACT COMMUNICATION DEVICE AND PAYMENT DEVICE

(71) Applicant: NEC Platforms, Ltd., Kawasaki-shi, Kanagawa (JP)

(72) Inventor: Junichi Sato, Kanagawa (JP)

(73) Assignee: NEC PLATFORMS, LTD, Kawasaki-shi, Kanagawa (JP)

( * ) Notice: Subject to any disclaimer, the term of this patent is extended or adjusted under 35 U.S.C. 154(b) by 34 days.

(21) Appl. No.: 15/524,789

(22) PCT Filed: Feb. 3, 2016

(86) PCT No.: PCT/JP2016/000551
§ 371 (c)(1),
(2) Date: May 5, 2017

(87) PCT Pub. No.: WO2016/147532
PCT Pub. Date: Sep. 22, 2016

(30) Foreign Application Priority Data

Mar. 16, 2015 (JP) .................................. 2015-051717

(51) Int. Cl.
*G06K 7/10* (2006.01)
(52) U.S. Cl.
CPC ..... *G06K 7/10297* (2013.01); *G06K 7/10386* (2013.01)
(58) Field of Classification Search
CPC .. G06Q 20/204; G06Q 20/322; G06Q 20/341; G06Q 20/352; G07F 7/0866; G07F 7/088; G07F 7/0893
See application file for complete search history.

(56) References Cited

U.S. PATENT DOCUMENTS

| | | | | |
|---|---|---|---|---|
| 8,061,620 | B2 * | 11/2011 | Phillips | ............... G06Q 20/204 235/492 |
| 8,249,935 | B1 * | 8/2012 | DiMartino | ........... G06Q 20/204 705/16 |
| 9,742,468 | B2 * | 8/2017 | Florek | .............. G06K 19/07732 |

FOREIGN PATENT DOCUMENTS

| | | |
|---|---|---|
| JP | 2005-192052 A | 7/2005 |
| JP | 2006-048455 A | 2/2006 |
| JP | 2006-215969 A | 8/2006 |

OTHER PUBLICATIONS

International Search Report of PCT/JP2016/000551 dated Mar. 1, 2016 [PCT/ISA/210].

(Continued)

*Primary Examiner* — Seung H Lee
(74) *Attorney, Agent, or Firm* — Sughrue Mion, PLLC

(57) ABSTRACT

A non-contact communication device includes a placement portion (30) and a non-contact communication unit (20) configured to perform non-contact communication to/from an article. The non-contact communication unit (20) includes a first antenna (23A) and a second antenna (23B). The placement portion (30) includes a first placement surface portion (32A) forming a first angle with respect to a device width direction (Hr), and a second placement surface portion (32B) forming a second angle larger than the first angle with respect to the device width direction (Hr). The first antenna (23A) is built into the first placement surface portion (32A), while the second antenna (23B) is built into the second placement surface portion (32B). The second placement surface portion (32B) is positioned above the first placement surface portion (32A), and has a width that is larger than a width of the first placement surface portion (32A).

10 Claims, 13 Drawing Sheets

(56) References Cited

OTHER PUBLICATIONS

Written Opinion of PCT/JP2016/000551 dated Mar. 1, 2016 [PCT/ISA/237].

* cited by examiner

NON-CONTACT COMMUNICATION DEVICE AND PAYMENT DEVICE

CROSS REFERENCE TO RELATED APPLICATIONS

This application is a National Stage of International Application No. PCT/JP2016/000551, filed Feb. 3, 2016, claiming priority based on Japanese Patent Application No. 2015-051717, filed Mar. 16, 2015, the contents of all of which are incorporated herein by reference in their entirety.

TECHNICAL FIELD

This invention relates to a non-contact communication device configured to perform non-contact communication to/from an article having a non-contact communication function, and to a payment device including the non-contact communication device.

BACKGROUND ART

As articles having a non-contact communication function, there are known a non-contact integrated circuit (IC) card, and mobile terminals having a non-contact communication function, such as a mobile phone, a smart phone, and a tablet terminal. As non-contact communication methods, there are known an electromagnetic communication method using electromagnetic induction or electromagnetic waves, a magnetic communication method, an optical communication method, and a combination of a plurality of those methods. Of those methods, the electromagnetic communication method is widely used for the reasons of stability and versatility in communication.

Further, many of those types of articles include a recording medium configured to record data in a rewritable manner. This type of article including the recording medium can be used for cashless payment of purchased products and services as an alternative to cash by recording value data, which is also called electronic money or the like, to the recording medium.

Meanwhile, when a non-contact communication device configured to perform non-contact communication to/from the article having the non-contact communication function is used for cashless payment as described above, the non-contact communication device is used in association with a payment device serving as a host device installed in a shop or the like.

As modes of the non-contact communication device to be used in association with the payment device regarding how the non-contact communication device is associated with the payment device, there are known a non-contact communication device that is installed separately from the payment device, and a non-contact communication device that is integrally mounted to the payment device. As an example of separate installation, there is known a non-contact communication device arranged close to a payment device, which is also called a cash register device, installed on a reception counter at shops or accommodation facilities. As an example of integral mounting, there is known a non-contact communication device mounted on a casing of a payment device, which is also called an outdoor apparatus, installed at self-service filling stations.

The cashless payment using the non-contact communication device is basically executed as follows. First, the article, for example, the non-contact IC card or the mobile terminal, is correctly positioned with respect to an antenna, which is included in the non-contact communication device, and serves as a connection interface. Next, non-contact communication is established between the non-contact communication device and the article via the antenna. Subsequently, the non-contact communication device reads out value data from the recording medium of the article, and transmits the value data to the payment device serving as the host device as necessary. Next, payment processing is performed by the payment device. Further, the non-contact communication device writes the updated value data to the recording medium of the article based on the result of payment by the payment device. Thus, the cashless payment is ended, and the payment processing is finished.

In this case, the article, for example, the non-contact IC card or the mobile terminal, is required to maintain a certain positional relationship with respect to the antenna of the non-contact communication device so that normal non-contact communication is performed during a time period from the start to the end of the above-mentioned cashless payment. In other words, when performing the cashless payment, the user is required to continuously hold the article at a correct position for a predetermined time period. This may be difficult and inconvenient for the user.

Therefore, in some cases, the non-contact communication device mounted to the payment device, for example, the outdoor apparatus includes a placement portion for enabling the user to release the article from his or her hand and place the article thereon so as to eliminate the need for the user to continuously hold the article at the correct position. The placement portion specifically includes a space portion, which is formed in a front panel of the payment device, and a placement surface portion, which is formed in a bottom surface of the space portion, and on which the article is to be placed. The space portion is formed in the front panel of the payment device, for example, the outdoor apparatus, so as to have such an opening area that the user can insert the article with hands and visually recognize whether or not the article is placed at a correct position. Further, the antenna is built into the placement surface portion.

This type of non-contact communication device is disclosed in, for example, Patent Document 1. The non-contact communication device disclosed in Patent Document 1 is mounted to a data processing device, and includes a placement portion on which a non-contact IC card or a mobile terminal is to be placed.

PRIOR ART DOCUMENTS

Patent Document

Patent Document 1: JP-A-2006-48455

SUMMARY OF THE INVENTION

Problem to be Solved by the Invention

There is a demand for downsizing payment devices such as the cash register device and the outdoor apparatus. There is also a demand for downsizing the non-contact communication devices used in association with such payment devices.

Meanwhile, the article having the non-contact communication function is often formed into a plate shape. Although the thickness of the articles does not markedly vary, the articles have various planar sizes ("width"דlength"). For example, the non-contact IC card generally has a planar size that is equal or close to that of a so-called credit card.

Further, among the mobile terminals having the non-contact communication function, a flip-type mobile phone has a planar size similar to that of the non-contact IC card, and a non-flip-type mobile phone has a size similar to that of the non-contact IC card at least in the width thereof. However, smart phones have a tendency toward increase in screen size, and the planar size thereof is increasing along therewith. Further, a tablet terminal often has a planar size that is larger than that of not only a mobile phone but also a smart phone. That is, the non-contact communication device is required to allow placement of articles having various planar sizes, including the smart phones increasing in size and the tablet terminals larger than the smart phones.

Therefore, this invention has an object to provide a non-contact communication device that is compatible with various-size articles having a non-contact communication function without increasing the width of the non-contact communication device.

Means to Solve the Problem

According to an aspect of this invention, there is provided a non-contact communication device, comprising:
  a placement portion on which an article having a non-contact communication function is to be placed; and
  a non-contact communication unit configured to perform non-contact communication to/from the article placed on the placement portion,
  the non-contact communication unit comprising a first connection interface and a second connection interface, which are each configured to be connected to the article in a non-contact manner,
  the placement portion comprising:
    a first placement surface portion, which forms a first angle that is smaller than 90 degrees with respect to a device width direction being a horizontal direction in front view, and to which the article is to be inserted in a depth direction to be placed; and
    a second placement surface portion, which forms a second angle that is larger than the first angle and smaller than 90 degrees with respect to the device width direction, and to which the article is to be inserted in the depth direction to be placed,
  the first connection interface being built into the first placement surface portion,
  the second connection interface being built into the second placement surface portion,
  the second placement surface portion being positioned above the first placement surface portion and having a width that is larger than a width of the first placement surface portion.

According to another aspect of this invention, there is provided the aforesaid non-contact communication device, wherein the non-contact communication unit further comprises a reader/writer configured to read out or write, when the article includes a recording medium configured to record data in a rewritable manner, data to/from the recording medium along with the non-contact communication to/from the article.

According to still another aspect of this invention, there is provided a payment device, comprising the aforesaid non-contact communication device,
  wherein the reader/writer of the non-contact communication unit is configured to read out or write value data to/from the recording medium along with the non-contact communication to/from the article.

Effect of the Invention

According to this invention, it is possible to provide the non-contact communication device that is compatible with various-size articles having a non-contact communication function without increasing the width of the non-contact communication device.

MODES FOR EMBODYING THE INVENTION

Figure 1:
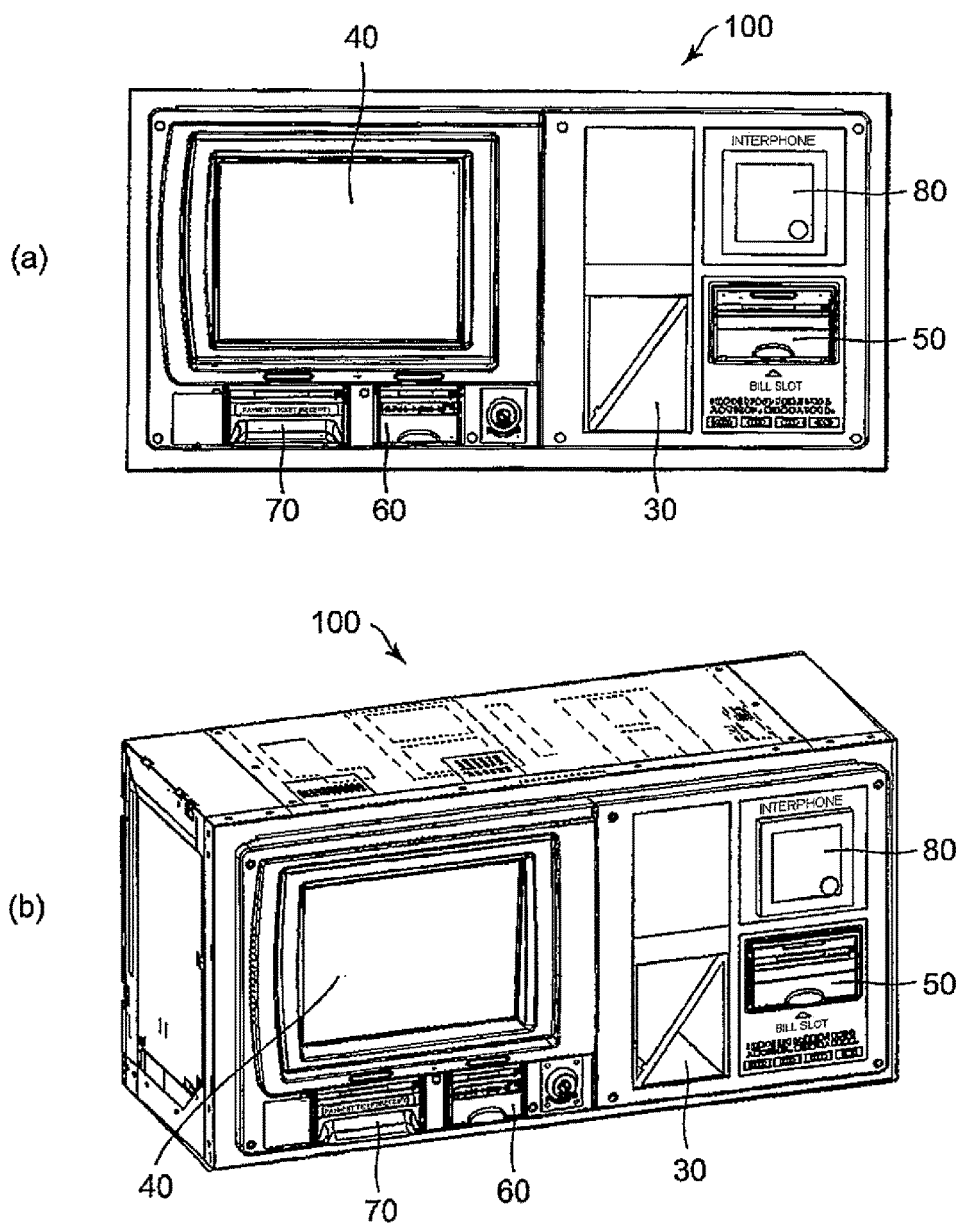
FIG. 1 includes views for illustrating an outdoor apparatus having mounted thereon a non-contact communication device according to a first embodiment of this invention, in which (a) is a front view and (b) is a perspective view.

A non-contact communication device according to this invention includes a placement portion on which an article having a non-contact communication function is to be placed, and a non-contact communication unit configured to perform non-contact communication to/from the article placed on the placement portion. The non-contact communication unit includes a first connection interface and a second connection interface, which are each configured to be connected to the article in a non-contact manner.

The placement portion includes a first placement surface portion and a second placement surface portion to each of which the article is to be inserted in a depth direction to be placed. The first connection interface is built into the first placement surface portion. Meanwhile, the second connection interface is built into the second placement surface portion.

The first placement surface portion forms a first angle that is smaller than 90 degrees with respect to a horizontal direction (device width direction) in front view. Meanwhile, the second placement surface portion forms a second angle that is larger than the first angle and smaller than 90 degrees with respect to the device width direction. The second placement surface portion has a width larger than that of the first placement surface portion.

With the above-mentioned configuration, in this non-contact communication device, a large-width article having a non-contact communication function, for example, a tablet terminal, can be placed on the second placement surface portion. Meanwhile, the second placement surface portion may have a vertically projected size that is equal to or smaller than a vertically projected size of the first placement surface portion. Therefore, the width of the non-contact communication device is not increased. In addition, the height can be set to be equivalent to the height that is at least required to be secured as described above.

In other words, the non-contact communication device according to this invention is compatible with various-size articles having a non-contact communication function without increasing the width of the non-contact communication device.

Now, with reference to the drawings, the non-contact communication devices according to specific embodiments of this invention are described.

First Embodiment

Referring to FIG. 1(a), FIG. 1(b), FIG. 2(a), FIG. 2(b), FIG. 3(a), and FIG. 3(b), a non-contact communication device according to a first embodiment of this invention is mounted to an outdoor apparatus 100 serving as a payment device to be mounted to a rack (not shown) installed close to a fuel dispenser (not shown) at a self-service filling station. The outdoor apparatus 100 is a payment device configured to perform setting for refueling during refueling, and to perform payment of fuel fees after the refueling.

The outdoor apparatus 100 includes the non-contact communication device, which is described in detail later, a display 40 with a touch panel, a banknote inputting device 50, a credit card reading device 60, a receipt printing printer 70, and an intercommunication device 80. Respective units other than the non-contact communication device depart from the gist of this invention, and hence detailed description thereof is omitted. Further, although not shown, a controller of the payment device is provided in the outdoor apparatus 100, and this controller is electrically connected to each unit.

Figure 2:
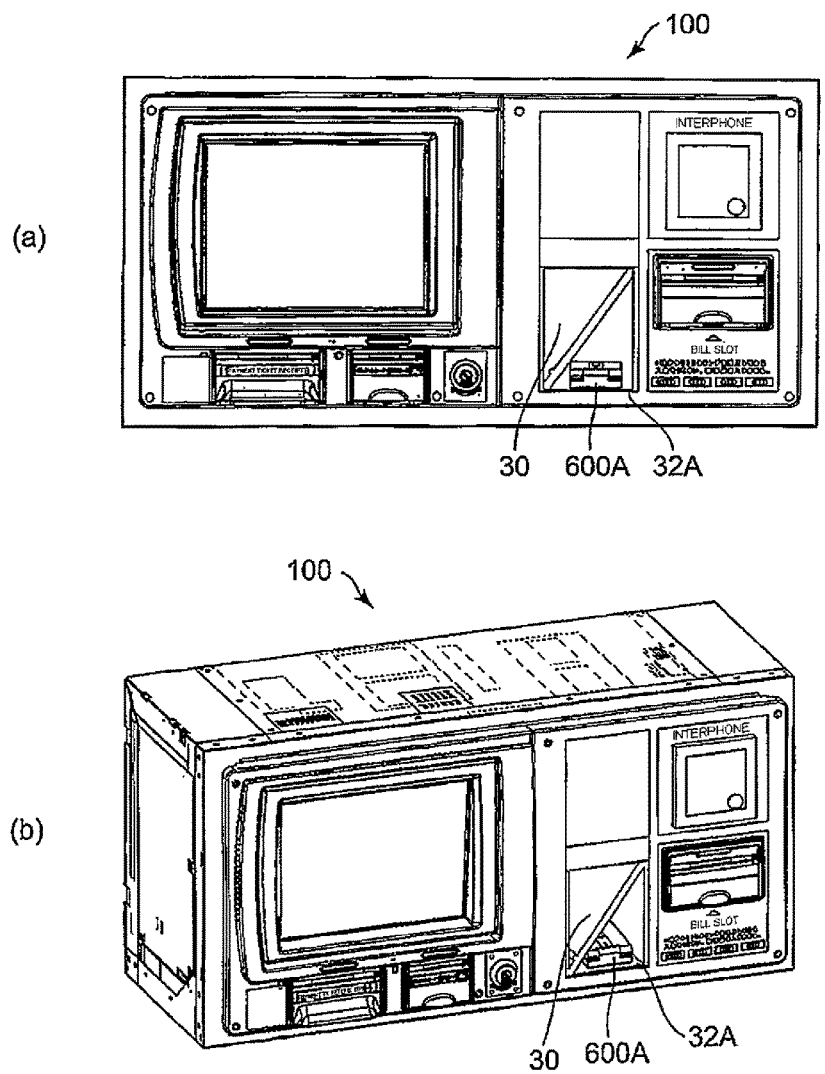
FIG. 2 includes views for illustrating the outdoor apparatus illustrated in FIG. 1 together with an article having a non-contact communication function, in which (a) is a front view and (b) is a perspective view.
Figure 3:
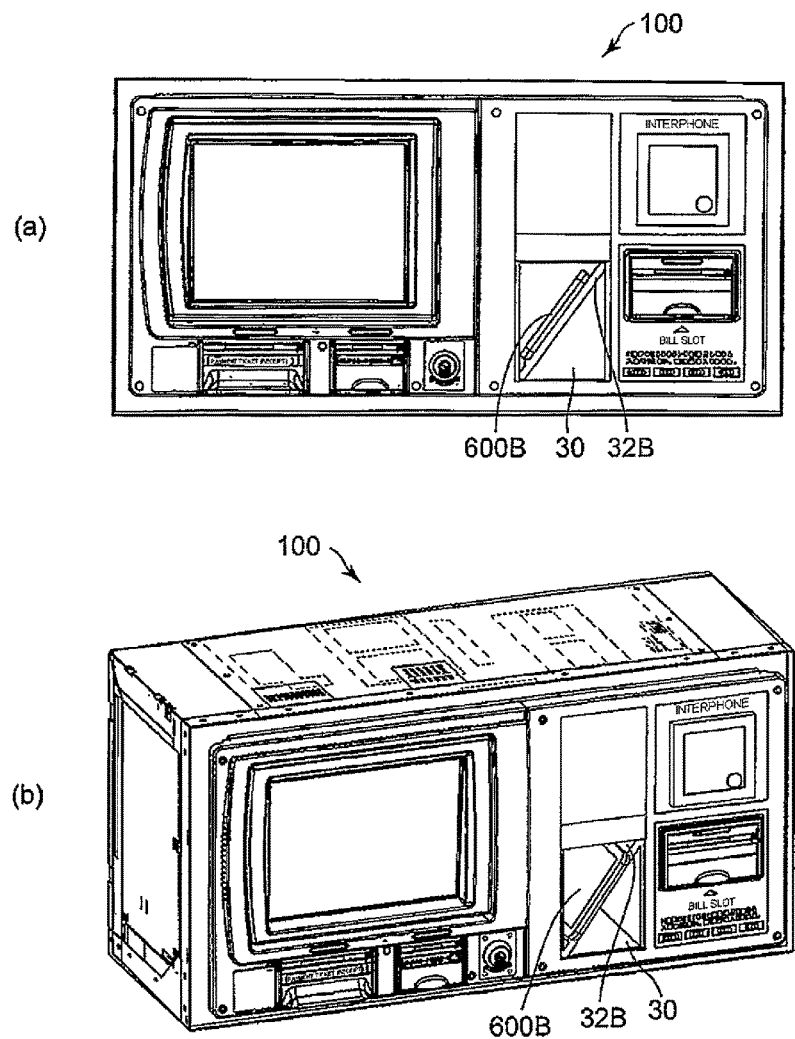
FIG. 3 includes views for illustrating the outdoor apparatus illustrated in FIG. 1 together with another article having a non-contact communication function, in which (a) is a front view and (b) is a perspective view.

In the first embodiment, as articles being non-contact communication targets of the non-contact communication device, there are given a non-contact IC card, a mobile phone 600A illustrated in FIG. 2(a) and FIG. 2(b), and a tablet terminal 600B illustrated in FIG. 3(a) and FIG. 3(b) as examples. Each of the mobile phone 600A and the tablet terminal 600B has the non-contact communication function, and includes a recording medium (not shown) configured to record value data in a rewritable manner. Therefore, each of the mobile phone 600A and the tablet terminal 600B can be used for cashless payment of the fuel price as an alternative to cash.

Figure 7:
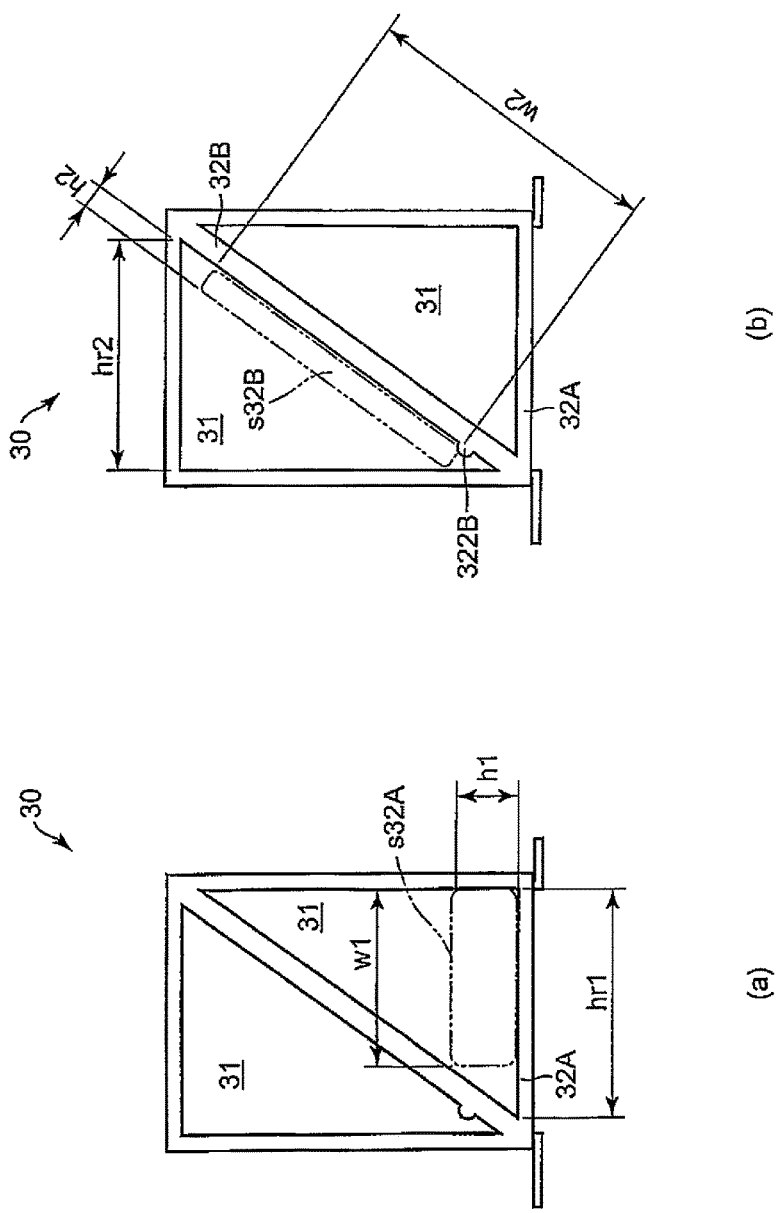
FIG. 7 includes views for illustrating placement spaces formed in the placement portion of the non-contact communication device illustrated in FIG. 4, in which (a) is a view for illustrating a placement space formed by the first placement surface portion, and (b) is a view for illustrating a placement space formed by the second placement surface portion.
Figure 8:
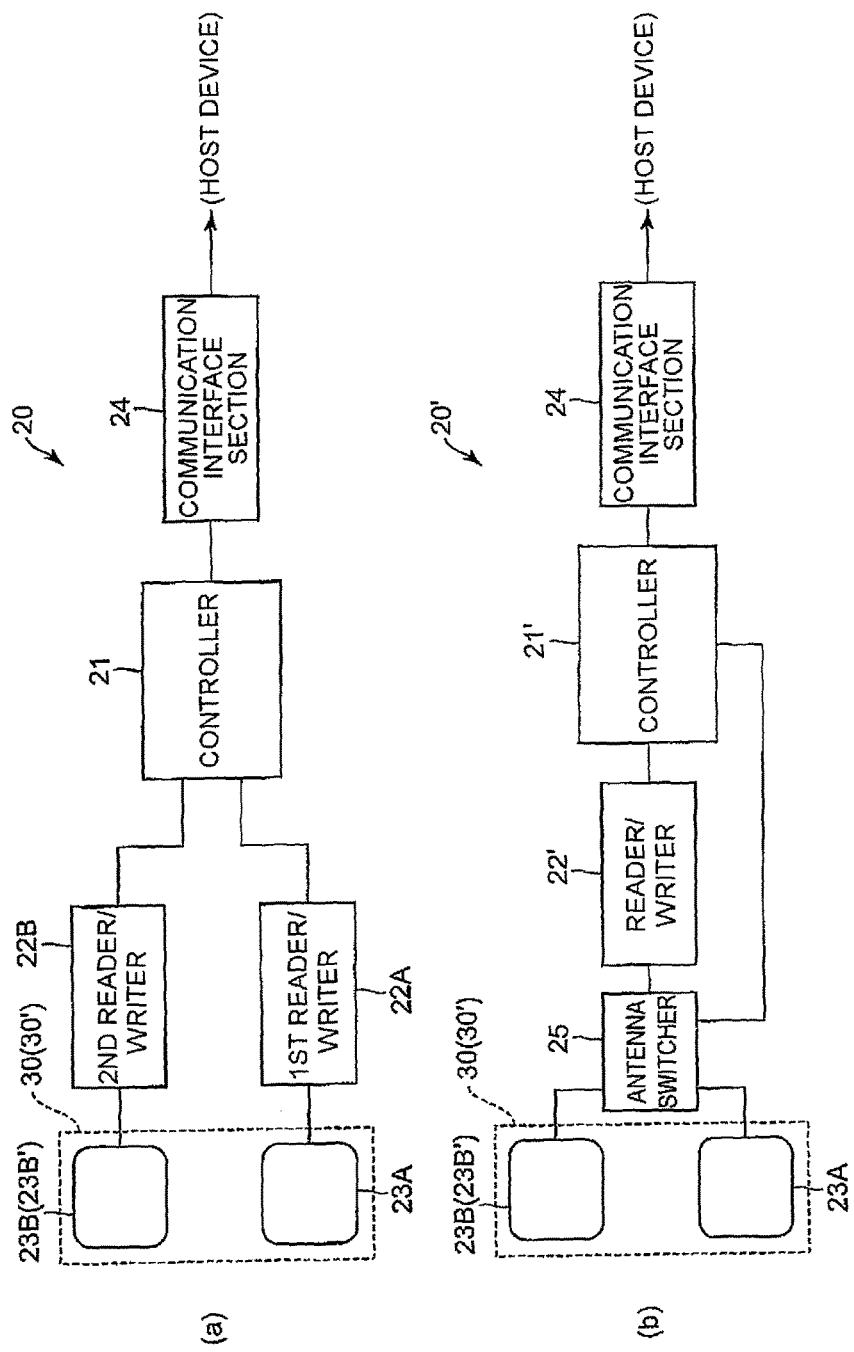
FIG. 8 includes block diagrams for illustrating a non-contact communication unit of the non-contact communication device according to the first embodiment of this invention, in which (a) is an example and (b) is a modification example.

Referring to FIG. 4(a) to FIG. 4(d), FIG. 5(a), FIG. 5(b), FIG. 6(a), FIG. 6(b), FIG. 7(a), FIG. 7(b), and FIG. 8(a), the non-contact communication device according to the first embodiment of this invention includes a placement portion 30 on which the mobile phone 600A (FIG. 2(a) and FIG. 2(b)) or the tablet terminal 600B (FIG. 3(a) and FIG. 3(b)) being the article having the non-contact communication function is to be placed, and a non-contact communication unit 20 (FIG. 8(a)) configured to perform non-contact communication to/from the article having the non-contact communication function placed on the placement portion 30.

The non-contact communication unit 20 includes a first antenna 23A serving as the first connection interface and a second antenna 23B serving as the second connection interface, which are each configured to be connected to the article in a non-contact manner with use of electromagnetic waves.

As a non-contact communication method of this invention, other than the communication method using the electromagnetic waves (including a communication method using electromagnetic induction), any one of a magnetic communication method, an optical communication method, and a combination of a plurality of those methods may be employed.

The placement portion 30 includes a space portion 31 configured to receive an article inserted in a depth direction D (for allowing insertion of the article), a first placement surface portion 32A, and a second placement surface portion 32B. The space portion 31 is formed into a quadrangular shape having a base that is parallel to a device width direction Hr (horizontal direction in front view). The first placement surface portion 32A and the second placement surface portion 32B are formed in the space portion 31.

Figure 12:
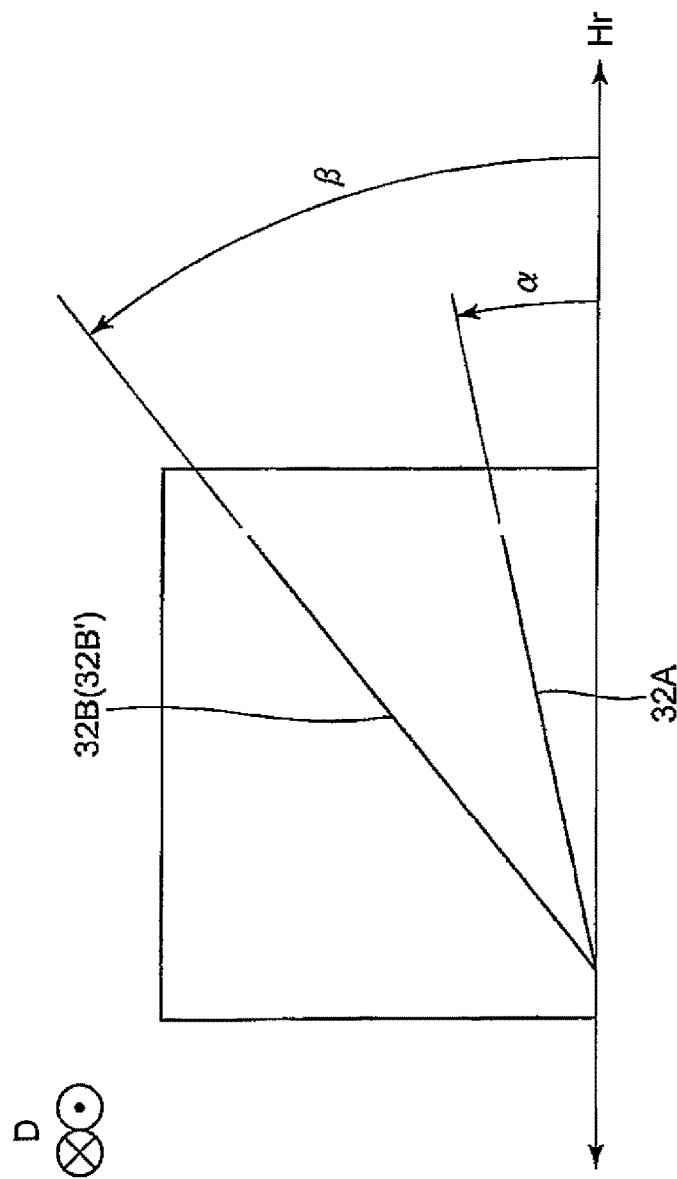
FIG. 12 is a schematic diagram for illustrating the first placement surface portion and the second placement surface portion in the non-contact communication devices according to the first and second embodiments of this invention.

Further, referring also to FIG. 12, the first placement surface portion 32A forms a first angle α that is smaller than 90 degrees with respect to the device width direction Hr. Meanwhile, the second placement surface portion 32B forms a second angle β that is larger than the first angle α and smaller than 90 degrees with respect to the device width direction Hr. In this example, the first angle α is 0 degrees. That is, the first placement surface portion 32A is formed on the base of the quadrangular shape of the space portion 31. Further, the second placement surface portion 32B is formed on a diagonal line of the quadrangular shape. The first placement surface portion 32A and the second placement surface portion 32B are only required to form the first angle and the second angle in front view, respectively. In the depth direction D, other than a horizontal state as in this example, the first placement surface portion 32A and the second placement surface portion 32B may be inclined so that the depth side or the front side thereof is gradually reduced in height.

As illustrated in, for example, FIG. 7(a) and FIG. 7(b), the second placement surface portion 32B includes a projection 322B formed so as to project from a placement surface like a rib on one of the right side and the left side of the second placement surface portion 32B in the width direction, whichever has a smaller height (in this example, on the left side). The projection 322B is capable of making contact with an outer shape of the article (in this example, the left side surface of the article) so that the article, for example, the tablet terminal 600B (FIG. 3(a) and FIG. 3(b)), is guided to be placed at a correct placement position in the width direction of the second placement surface portion 32B, and so that the article is regulated from being deviated from the correct placement position.

The first placement surface portion 32A may include a recess capable of making contact with the outer shape of the article (e.g., the right and left side surfaces of the article and the side surface on the depth side at the time of placement, or the right and left side surfaces, the side surface on the depth side, and the side surface on the front side) so that the article, for example, the mobile phone 600A (FIG. 2(a) and FIG. 2(b)), is guided to be placed at a correct placement position in the depth direction D and in the width direction of the first placement surface portion 32A, and so that the article is regulated from being deviated from the correct placement position. For example, a recess 322A as virtually indicated by the dashed-dotted line of FIG. 5(b) may be formed in the first placement surface portion 32A.

Figure 13:
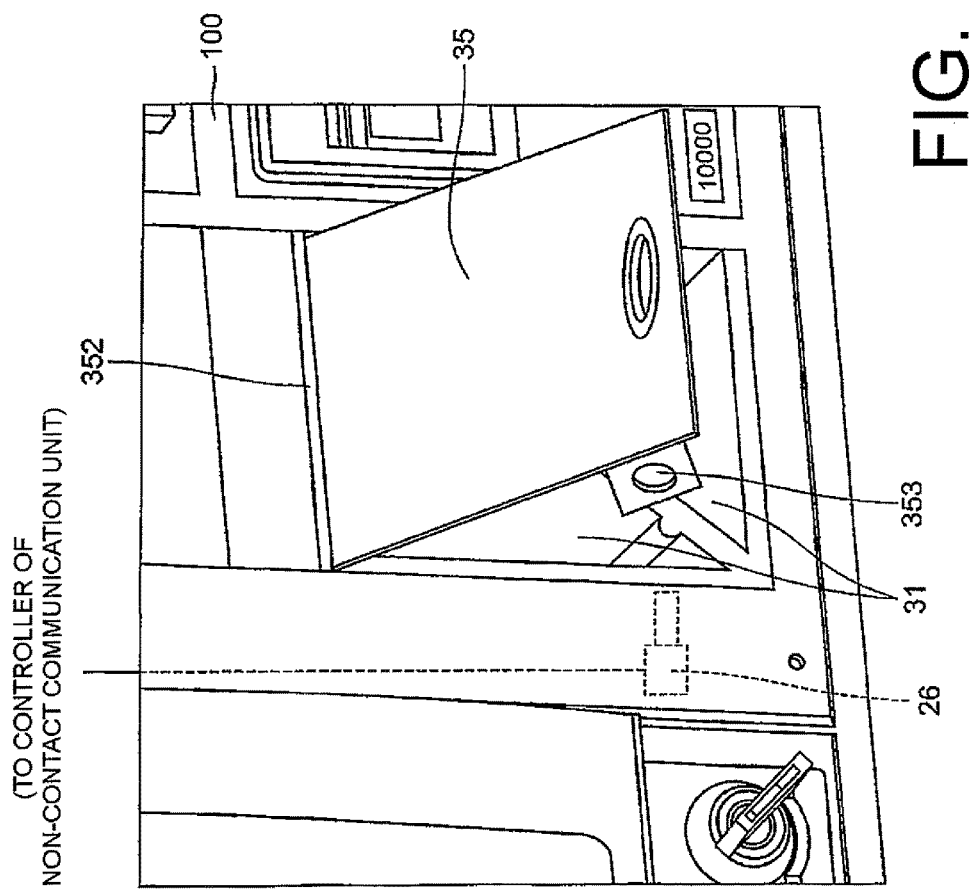
FIG. 13 is a perspective view for illustrating a door configured to open and close a space portion as a modification example of the non-contact communication devices according to the first and second embodiments of this invention.

Further, as illustrated in FIG. 13, the placement portion 30 of the non-contact communication device may include a door 35, which is provided at an opening end of the space portion 31, and is capable of manually opening and closing the space portion 31. Referring to FIG. 13, the door 35 is pivotable about a pivot shaft 352 so as to open and close the space portion 31 opened in the front surface of the outdoor apparatus 100. Further, the outdoor apparatus 100 includes an electromagnetic latch portion 26. The latch portion 26 is electrically connected to a controller 21 of the non-contact communication unit 20 illustrated in FIG. 8(a). Then, during payment processing using non-contact communication to/from the article placed at the correct placement position, the controller 21 of the non-contact communication unit 20 locks the door 35 so as not to be opened by inserting a leading end of the latch portion 26 into an engagement portion 353 formed on the closed door 35. After the payment processing accompanied with the non-contact communication is finished, the controller 21 removes the leading end of the latch portion 26 from the engagement portion 353 of the door 35. With this, the user can open the door 35 to take out the article. The door 35 is locked during the payment processing accompanied with the non-contact communication, and hence the article can be prevented from being carelessly moved during the non-contact communication to cause trouble in the communication. Further, the article can be prevented from being taken out before the updated value data is written to the recording medium of the article, that is, before the payment processing is finished.

The first antenna 23A serving as the first connection interface is built into the first placement surface portion 32A. Meanwhile, the second antenna 23B serving as the second connection interface is built into the second placement surface portion 32B. In this invention, a state in which the first and second connection interfaces are built into the first and second placement surface portions, respectively, includes a state in which the first and second connection interfaces are mounted to the first and second placement surface portions, respectively, under a state in which the first and second connection interfaces are partially exposed. For example, when optical non-contact communication is performed, an optical scanner or the like serving as the connection interface may be partially exposed from the surface of the placement surface portion.

In this example, the first antenna 23A and the second antenna 23B are planar antennas. Each of the first antenna 23A and the second antenna 23B may be formed such that a plurality of antennas are arranged in the depth direction D and those antennas are connected in series or in parallel.

As illustrated in FIG. 7(a) and FIG. 7(b), the second placement surface portion 32B has a width (substantially w2) that is larger than a width (substantially w1) of the first placement surface portion 32A. The first placement surface portion 32A has a space s32A (width w1×height h1) in which the article can be placed. Meanwhile, the second placement surface portion 32B has a space s32B (width w2×height h2) in which the article can be placed. In this example, the width w1 is 60 mm, the height h1 is 20 mm, the width w2 is 120 mm, and the height h2 is 10 mm. Those widths of the spaces are increased or decreased depending on the width and the height to be secured. Further, the placement space s32A and the placement space s32B have equivalent depth dimensions.

Therefore, on the first placement surface portion 32A, an article to be inserted in the depth direction D, specifically, an article having a relatively small width, for example, the mobile phone 600A (FIG. 2(a) and FIG. 2(b)) or the non-contact IC card, is placed. Meanwhile, on the second placement surface portion 32B, an article to be inserted in the depth direction D, specifically, an article having a relatively large width and thus is incapable of being placed on the first placement surface portion 32A, for example, the tablet terminal 600B (FIG. 3(a) and FIG. 3(b)), is mainly placed. The article having a relatively small width, for example, the mobile phone 600A (FIG. 2(a) and FIG. 2(b)) or the non-contact IC card, may be placed on the second placement surface portion 32B.

It is preferred that, as illustrated in FIG. 7(a) and FIG. 7(b), a vertically projected size hr2 of the second placement surface portion 32B be equivalent to or smaller than a vertically projected size hr1 of the first placement surface portion 32A. This is because, when the vertically projected size hr2 exceeds the vertically projected size hr1, the width of the non-contact communication device is increased.

Figure 4:
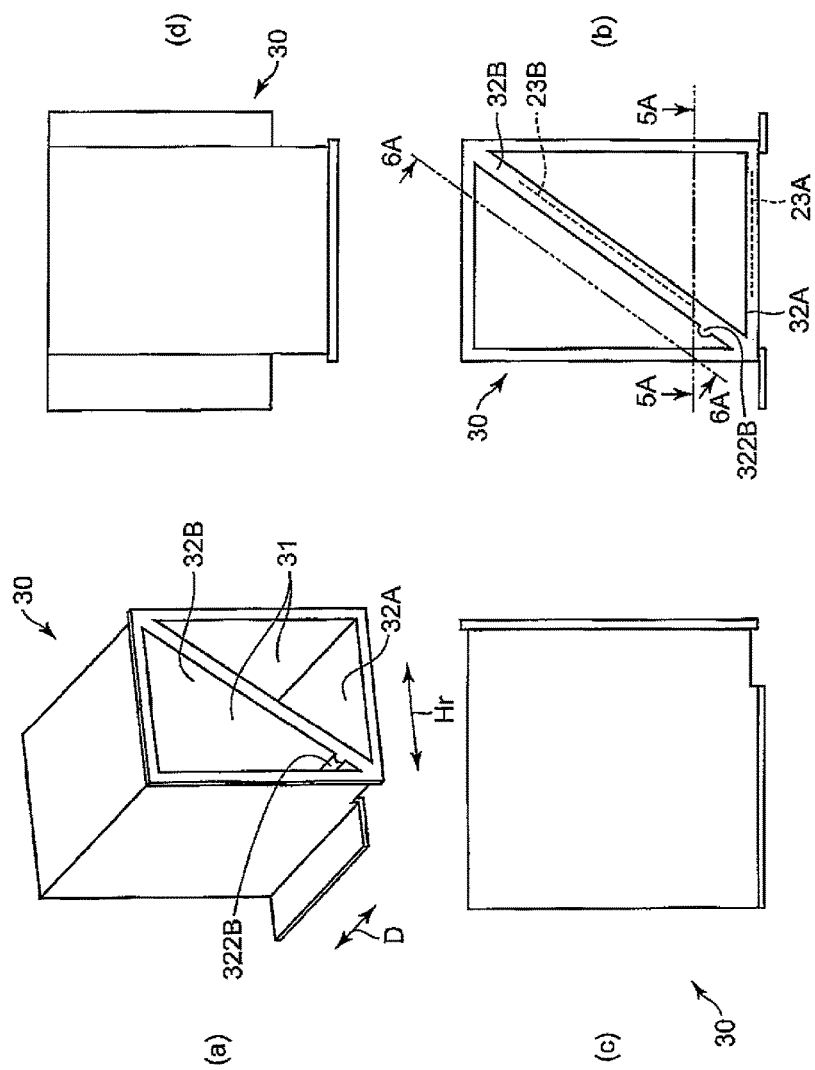
FIG. 4 includes views for illustrating a placement portion of the non-contact communication device according to the first embodiment of this invention, in which (a) is a perspective view, (b) is a front view, (c) is a left side view, and (d) is a plane view.
Figure 5:
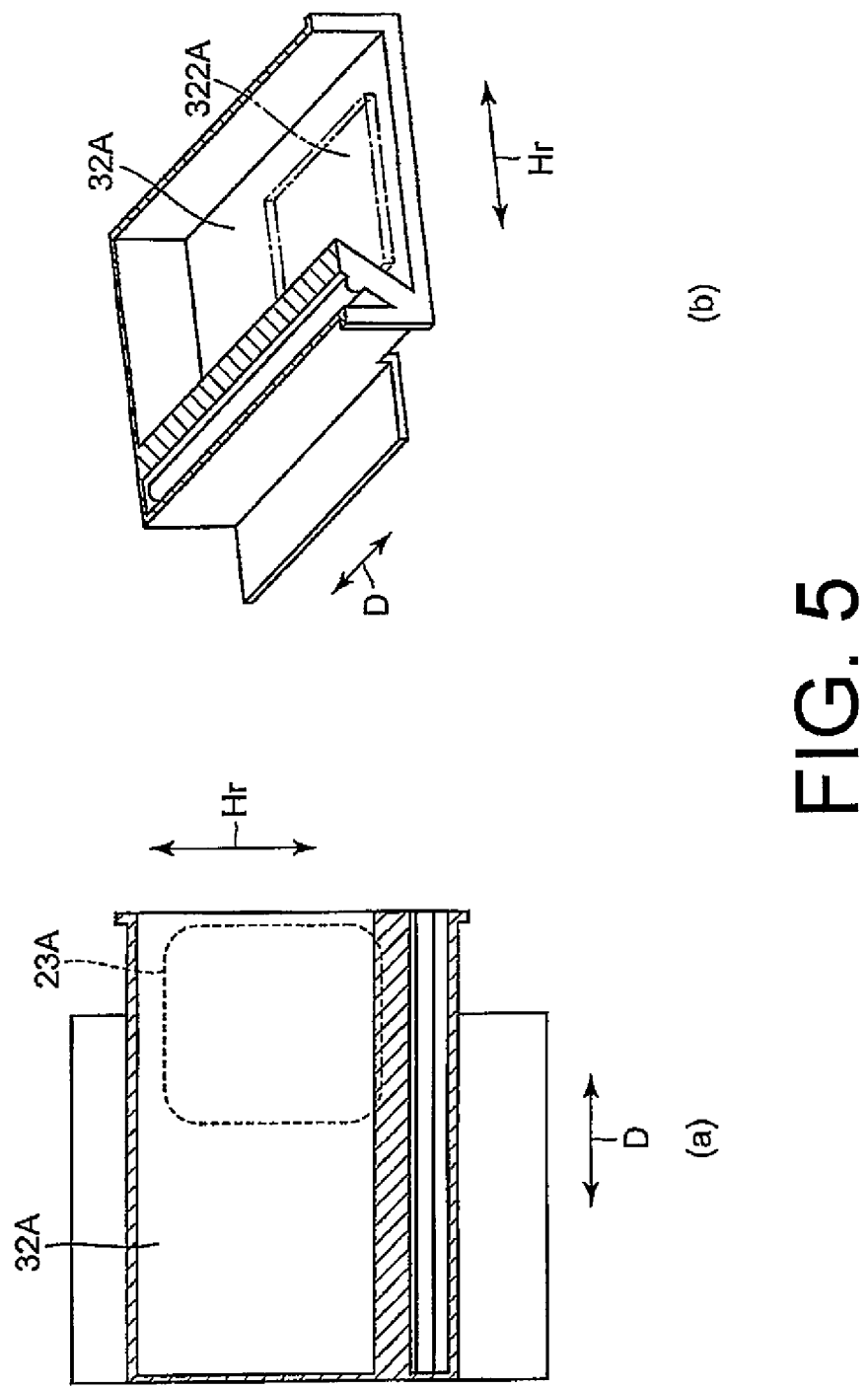
FIG. 5 includes views for illustrating a first placement surface portion by virtually cutting the placement portion of the non-contact communication device illustrated in FIG. 4 in a cross section taken along the cutting line 5A-5A of FIG. 4(b), in which (a) is a plane view and (b) is a perspective view.
Figure 6:
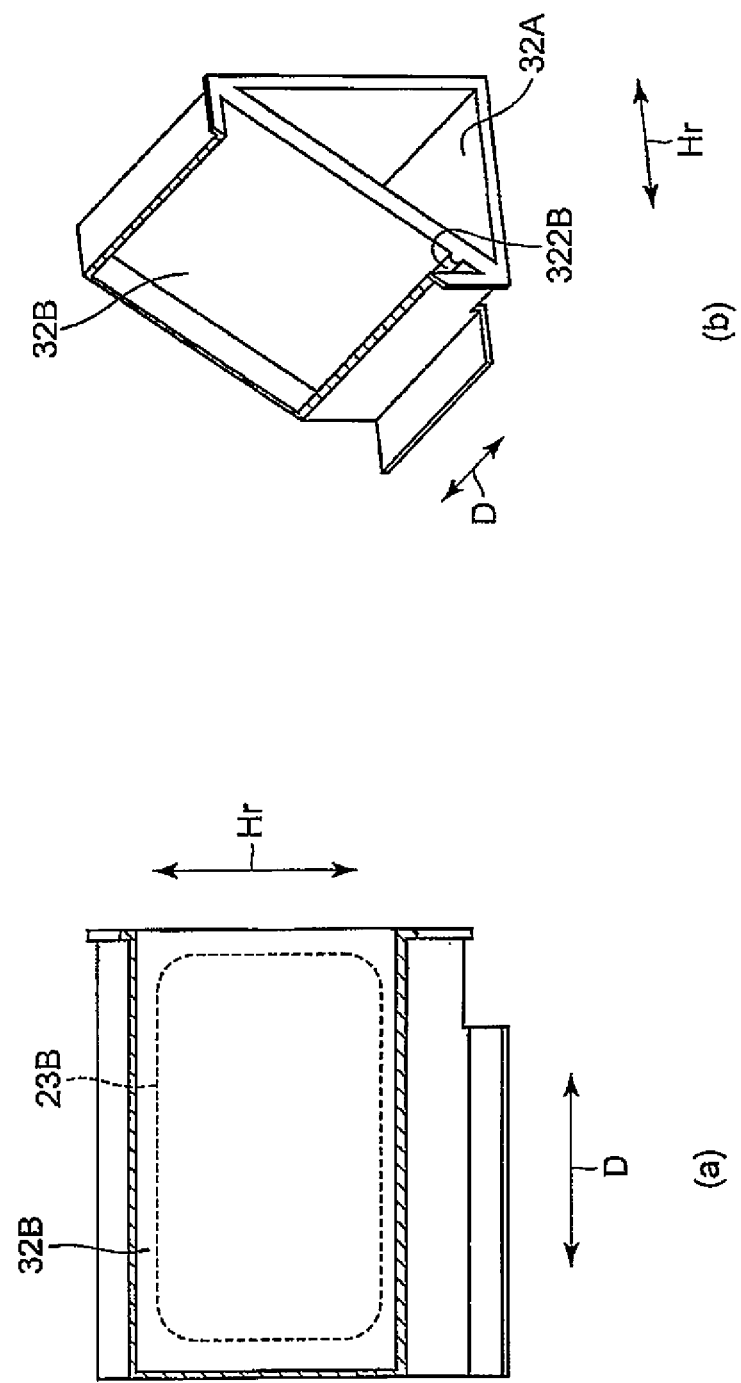
FIG. 6 includes views for illustrating a second placement surface portion by virtually cutting the placement portion of the non-contact communication device illustrated in FIG. 4 in a cross section taken along the cutting line 6A-6A of FIG. 4(b), in which (a) is a plane view and (b) is a perspective view.

Referring to FIG. 8(a), the non-contact communication unit 20 includes the first antenna 23A built into the first placement surface portion 32A (e.g., FIG. 4(a)) of the placement portion 30, the second antenna 23B built into the second placement surface portion 32B (e.g., FIG. 4(a)) of the placement portion 30, a first reader/writer 22A connected to the first antenna 23A, a second reader/writer 22B connected to the second antenna 23B, the controller 21 configured to control the entire non-contact communication unit 20, and a communication interface section 24 configured to communicate to/from a host device configured to execute the payment processing. In the first embodiment, the host device refers to the outdoor apparatus 100 illustrated in, for example, FIG. 1(a) and FIG. 1(b). Further, the controller 21 includes an arithmetic element and a storage section, and is configured to operate based on a software program stored in the storage section.

The first reader/writer 22A is configured to read out or write the value data to/from the recording medium included in, for example, the non-contact IC card or the mobile phone 600A (FIG. 2(a) and FIG. 2(b)), along with the non-contact communication to/from those articles via the first antenna 23A. The second reader/writer 22B is configured to read out or write the value data to/from the recording medium included in, for example, the tablet terminal 600B (FIG. 3(a) and FIG. 3 (b)), along with the non-contact communication to/from the tablet terminal 600B via the second antenna 23B.

Figure 9:
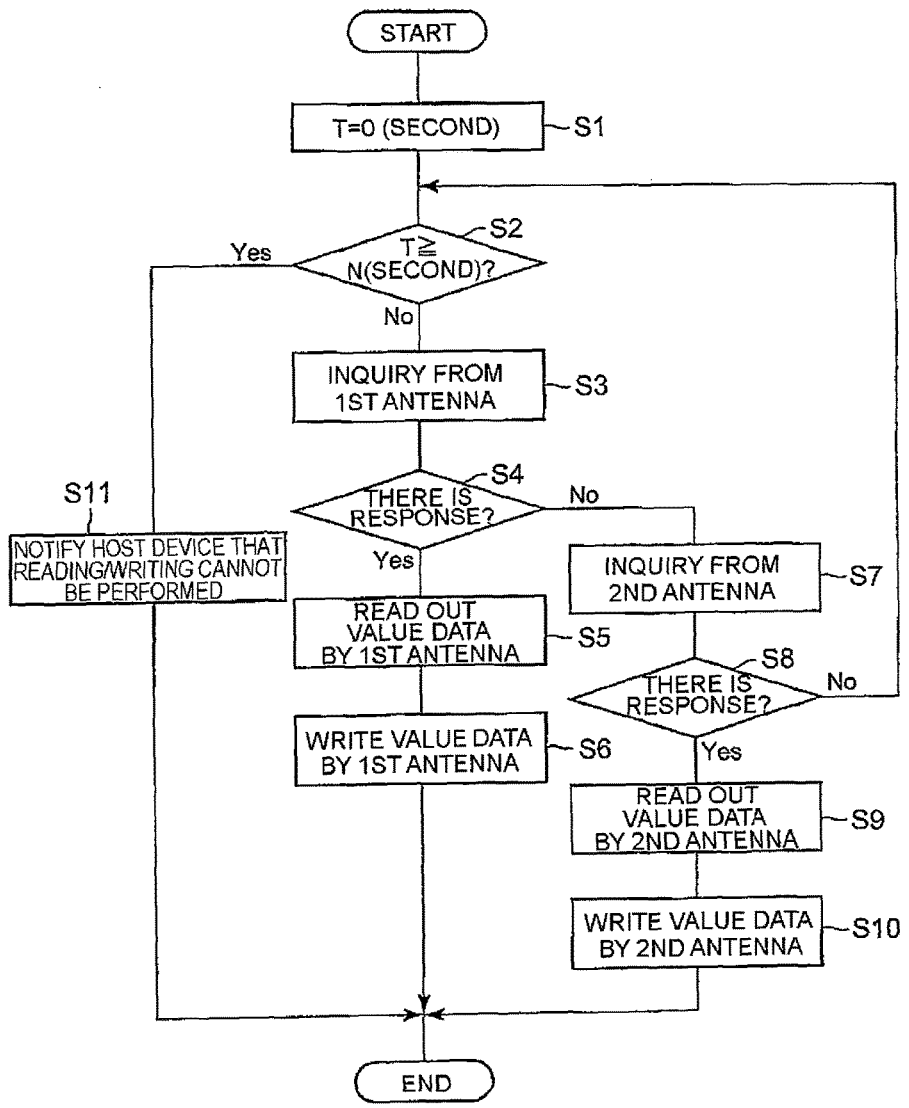
FIG. 9 is a flow chart for illustrating an operation of the non-contact communication unit of the non-contact communication device according to the first embodiment of this invention.
Figure 10:
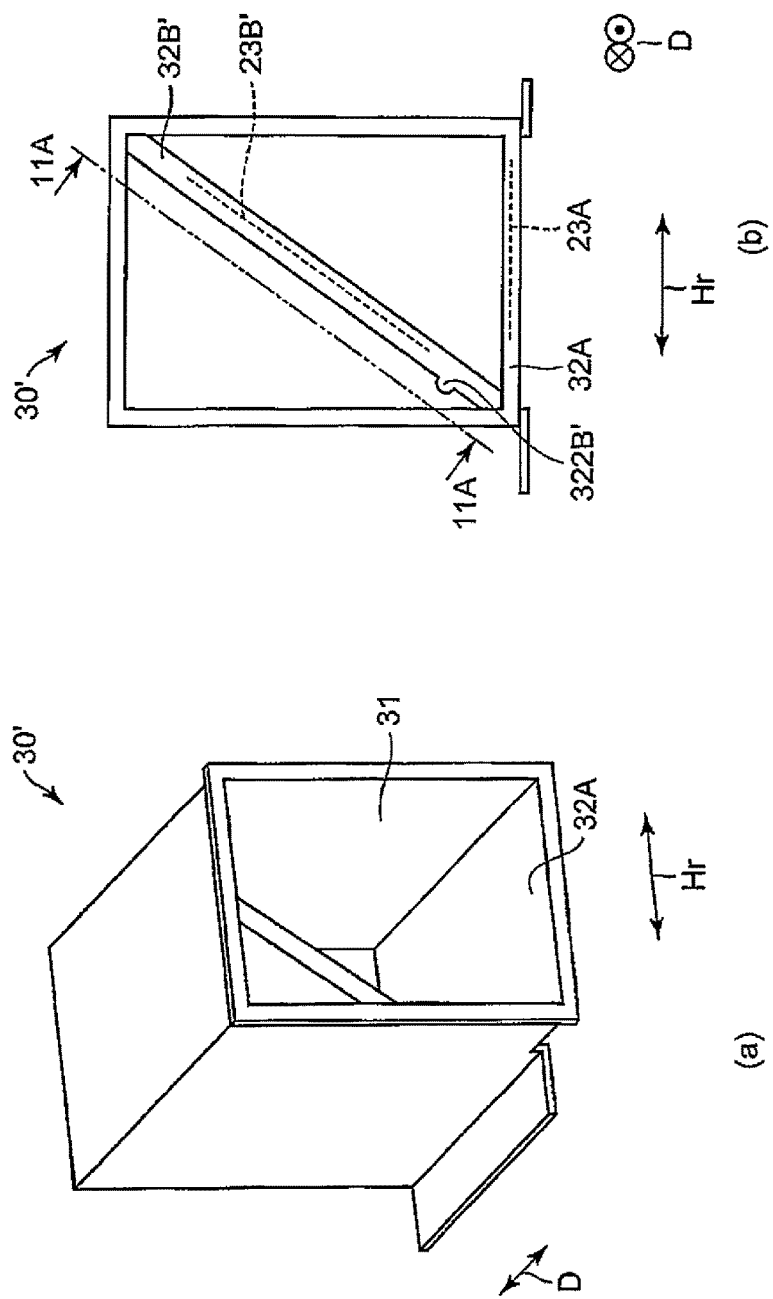
FIG. 10 includes views for illustrating a placement portion of a non-contact communication device according to a second embodiment of this invention, in which (a) is a perspective view and (b) is a front view.
Figure 11:
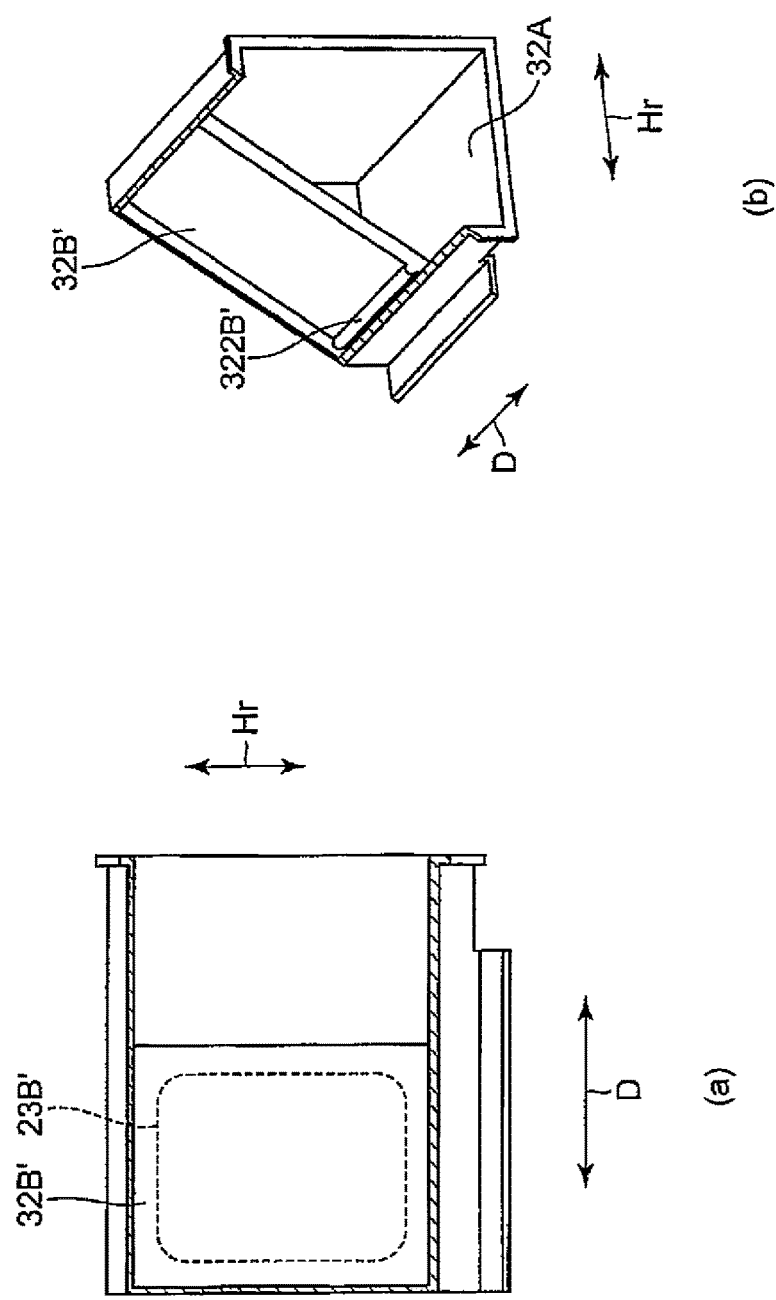
FIG. 11 includes views for illustrating a second placement surface portion by virtually cutting the placement portion of the non-contact communication device illustrated in FIG. 10 in a cross section taken along the cutting line 11A-11A of FIG. 10(b), in which (a) is a plane view and (b) is a perspective view.

Next, with reference also to FIG. 9, an operation of the non-contact communication device according to the first embodiment is described.

When the non-contact communication device according to the first embodiment receives a processing request from the controller of the outdoor apparatus 100 (e.g., FIG. 1(a) and FIG. 1(b)) being the host device, the non-contact communication device performs processing in accordance with the procedure illustrated in FIG. 9. In this case, the processing requested by the outdoor apparatus 100 refers to processing of reading out or writing the value data to/from the recording medium included in the article having the non-contact communication function along with the payment processing performed by the outdoor apparatus 100.

In Step S1, the controller 21 of the non-contact communication unit 20 illustrated in FIG. 8(a) resets a built-in timer in accordance with a value-data readout request, which is received from the controller of the outdoor apparatus 100 via the communication interface section 24.

Subsequently, in Step S2, the controller 21 detects whether or not the value of the timer is equal to or larger than a predetermined time (e.g., 5 seconds). As a result of the detection, when the value of the timer is smaller than the predetermined time (No in Step S2), the processing proceeds to Step S3. On the other hand, when the value of the timer is equal to or larger than the predetermined time (Yes in Step S2), the processing proceeds to Step S11.

In Step S3, the controller 21 transmits radio waves for an inquiry of presence or absence of the article having the non-contact communication function with use of the first reader/writer 22A and the first antenna 23A.

Subsequently, in Step S4, the controller 21 detects whether or not there is a response from the article with respect to the inquiry with use of the first antenna 23A and the first reader/writer 22A. As a result of the detection, when there is a response, the controller 21 determines that the article having the non-contact communication function is placed on the first placement surface portion 32A (Yes in Step S4), and proceeds to Step S5. On the other hand, when there is no response, the controller 21 determines that the article having the non-contact communication function is not placed on the first placement surface portion 32A (No in Step S4), and proceeds to Step S7.

In Step S5, the controller 21 reads out the value data from the recording medium of the article, for example, the non-contact IC card or the mobile phone 600A (FIG. 2(a) and FIG. 2(b)), which is determined to be placed on the first placement surface portion 32A, with use of the first antenna 23A and the first reader/writer 22A, and transmits the read-out value data from the communication interface section 24 to the controller of the outdoor apparatus 100 being the host device.

Subsequently, in Step S6, the controller 21 writes the updated value data to the recording medium of the article, for example, the non-contact IC card or the mobile phone 600A, which is placed on the first placement surface portion 32A, with use of the first reader/writer 22A and the first antenna 23A based on a request of writing the updated value data, which is received from the controller of the outdoor apparatus 100 via the communication interface section 24, and transmits a signal indicating that the writing is finished from the communication interface section 24 to the controller of the outdoor apparatus 100 being the host device. After that, the processing of reading out or writing the value data is ended.

In Step S7, the controller 21 transmits radio waves for an inquiry of presence or absence of the article having the non-contact communication function with use of the second reader/writer 22B and the second antenna 23B.

Subsequently, in Step S8, the controller 21 detects whether or not there is a response from the article with respect to the inquiry with use of the second antenna 23B and the second reader/writer 22B. As a result of the detection, when there is a response, the controller 21 determines that the article having the non-contact communication function is placed on the second placement surface portion 32B (Yes in Step S8), and proceeds to Step S9. On the other hand, when there is no response, the controller 21 determines that the article having the non-contact communication function is not placed on the second placement surface portion 32B (No in Step S8), and returns to Step S2.

In Step S9, the controller 21 reads out the value data from the recording medium of the article, for example, the tablet terminal 600B (FIG. 3(a) and FIG. 3(b)), which is determined to be placed on the second placement surface portion 32B, with use of the second antenna 23B and the second reader/writer 22B, and transmits the read-out value data from the communication interface section 24 to the controller of the outdoor apparatus 100 being the host device.

Subsequently, in Step S10, the controller 21 writes the updated value data to the recording medium of the article, for example, the tablet terminal 600B, which is placed on the second placement surface portion 32B, with use of the second reader/writer 22B and the second antenna 23B based on a request of writing the updated value data, which is received from the controller of the outdoor apparatus 100 via the communication interface section 24, and transmits a signal indicating that the writing is finished from the communication interface section 24 to the controller of the outdoor apparatus 100 being the host device. After that, the processing of reading out or writing the value data is ended.

In Step S11, the controller 21 determines that the article having the non-contact communication function is placed on neither the first placement surface portion 32A nor the second placement surface portion 32B based on the value of the timer detected to be equal to or larger than the predetermined time, and causes the communication interface section 24 to notify the controller of the outdoor apparatus 100 being the host device that the processing of reading out or writing the value data cannot be performed.

In Step S2 of the processing of reading out or writing the data described above, it is determined that the article having the non-contact communication function is placed on neither the first placement surface portion 32A nor the second placement surface portion 32B when a predetermined time or more elapses after the start of the inquiry. Alternatively, it may be determined that the article having the non-contact communication function is placed on neither the first placement surface portion 32A nor the second placement surface portion 32B when the counted number of times of inquiries reaches a predetermined number of times.

Further, in Steps S3 and S4 and Steps S7 and S8 of the processing of reading out or writing the data described above, it is determined on which of the first placement surface portion 32A and the second placement surface portion 32B the article having the non-contact communication function is placed by transmitting radio waves for inquiry of the presence or absence of the article having the non-contact communication function from the first antenna 23A and the second antenna 23B, and detecting whether or not there is a response from the article. Alternatively, a sensor configured to detect that some kind of article is placed on the first placement surface portion 32A or the second placement surface portion 32B may be provided, and it may be determined on which of the first placement surface portion 32A and the second placement surface portion 32B the article is placed based on a detection signal from the sensor.

The non-contact communication unit of the non-contact communication device according to the first embodiment may have a configuration different from that of the non-contact communication unit 20 illustrated in FIG. 8(a). For example, the non-contact communication unit may be configured as a non-contact communication unit 20' illustrated in FIG. 8(b).

Referring to FIG. 8(b), the non-contact communication unit 20' being a modification example of the non-contact communication unit 20 includes the first antenna 23A built into the first placement surface portion 32A (e.g., FIG. 4(a)) of the placement portion 30, the second antenna 23B built into the second placement surface portion 32B (e.g., FIG. 4(a)) of the placement portion 30, an antenna switcher 25 connected to the first antenna 23A and the second antenna 23B, a reader/writer 22' connected to the antenna switcher 25, a controller 21' configured to control the entire non-contact communication unit 20', and the communication interface section 24 configured to communicate to/from the outdoor apparatus 100 (the controller thereof) illustrated in, for example, FIG. 1(a) and FIG. 1(b), which corresponds to the host device configured to execute the payment processing. The controller 21' includes an arithmetic element and a storage section, and is configured to operate based on a software program stored in the storage section.

The reader/writer 22' is configured to read out or write data to/from the recording medium included in an article, for example, the non-contact IC card, the mobile phone 600A (FIG. 2(a) and FIG. 2(b)), or the tablet terminal 600B (FIG. 3(a) and FIG. 3(b)), along with the non-contact communication to/from the article via one of the first antenna 23A and the second antenna 23B, whichever is selected by the controller 21' with use of the antenna switcher 25.

The antenna switcher may have a simpler configuration than that of the reader/writer. Therefore, the non-contact communication unit 20' may be formed at a lower cost than that of the non-contact communication unit 20 including two reader/writers as illustrated in FIG. 8(a).

Second Embodiment

A second embodiment of this invention differs from the first embodiment in the shape and size of the second placement surface portion. Therefore, the description and the reference drawings of the first embodiment are also used for parts of the second embodiment, which are the same or similar to those of the first embodiment, and detailed description thereof is omitted herein.

Referring to FIG. 10(a) and FIG. 10(b), and FIG. 11(a) and FIG. 11(b), the non-contact communication device according to the second embodiment of this invention includes a placement portion 30' on which the non-contact IC card, the mobile phone, or the tablet terminal being the article having the non-contact communication function is to be placed, and the non-contact communication unit 20 configured to perform non-contact communication to/from the article having the non-contact communication function placed on the placement portion 30'.

Referring to FIG. 8(a) used for the second embodiment as well, the non-contact communication unit 20 includes the first antenna 23A serving as the first connection interface and a second antenna 23B' serving as the second connection interface (described as "second antenna 23B (23B')" in FIG. 8(a)), which are each configured to be connected to the article in a non-contact manner with use of electromagnetic waves, the first reader/writer 22A connected to the first antenna 23A, the second reader/writer 22B connected to the second antenna 23B', the controller 21 configured to control the entire non-contact communication unit 20, and the communication interface section 24 configured to communicate to/from the host device (outdoor apparatus or payment device) configured to execute the payment processing.

The placement portion 30' includes a space portion 31 configured to receive an article inserted in the depth direction D (for allowing insertion of the article), the first placement surface portion 32A, and a second placement surface portion 32B'. The space portion 31 is formed into a quadrangular shape having a base that is parallel to the device width direction Hr in front view. The first placement surface portion 32A and the second placement surface portion 32B' are formed in the space portion 31.

Further, referring also to FIG. 12, the first placement surface portion 32A forms the first angle α that is smaller than 90 degrees with respect to the device width direction Hr. Meanwhile, the second placement surface portion 32B' forms the second angle β that is larger than the first angle α and smaller than 90 degrees with respect to the device width direction Hr. In this example, the first angle α is 0 degrees. That is, the first placement surface portion 32A is formed on the base of the quadrangular shape of the space portion 31. Further, the second placement surface portion 32B' is formed on a diagonal line of the quadrangular shape.

The second placement surface portion 32B' includes a projection 322B' formed so as to project from a placement surface like a rib on one of the right side and the left side of the second placement surface portion 32B' in the width direction, whichever has a smaller height (in this example, on the left side). The projection 322B' is capable of making contact with an outer shape of the article (in this example, the left side surface of the article) so that the article, for example, the tablet terminal, is guided to be placed at a correct placement position in the width direction of the second placement surface portion 32B', and so that the article is regulated from being deviated from the correct placement position.

Further, although not provided in this example, the first placement surface portion 32A may include a recess capable of making contact with the outer shape of the article so that the article, for example, the non-contact IC card or the mobile phone, is guided to be placed at a correct placement position in the depth direction D and in the width direction of the first placement surface portion 32A, and so that the article is regulated from being deviated from the correct placement position.

Further, as illustrated in FIG. 13, the placement portion 30' of the non-contact communication device may include the door 35, which is provided at an opening end of the space portion 31, and is capable of manually opening and closing the space portion 31. Referring to FIG. 13, the door 35 is pivotable about the pivot shaft 352 so as to open and close the space portion 31 opened in the front surface of the outdoor apparatus 100. Further, the outdoor apparatus 100 includes the electromagnetic latch portion 26. The latch portion 26 is electrically connected to a controller 21' of the non-contact communication unit 20' illustrated in FIG. 8(b). Then, during payment processing using non-contact communication to/from the article placed at a correct placement position, the controller 21' of the non-contact communication unit 20 locks the door 35 so as not to be opened by inserting a leading end of the latch portion 26 to the engagement portion 353 formed on the closed door 35. After the payment processing accompanied with the non-contact communication is finished, the controller 21' removes the leading end of the latch portion 26 from the engagement portion 353 of the door 35. With this, the user can open the door 35 to take out the article. The door 35 is locked during the payment processing accompanied with the non-contact communication, and hence the article can be prevented from being carelessly moved to cause trouble in the communication. Further, the article can be prevented from being stolen before the updated value data is written to the recording medium of the article, that is, before the payment processing is finished.

The first antenna 23A is built into the first placement surface portion 32A of the placement portion 30'. Meanwhile, the second antenna 23B' is built into the second placement surface portion 32B' of the placement portion 30'. In this example, the first antenna 23A and the second antenna 23B' are planar antennas. The first antenna 23A may be formed such that a plurality of antennas are arranged in the depth direction D and those antennas are connected in series or in parallel.

The second placement surface portion 32B' has a width that is larger than a width of the first placement surface portion 32A. Therefore, on the first placement surface portion 32A, an article to be inserted in the depth direction D, specifically, an article having a relatively small width, for example, the mobile phone or the non-contact IC card, is placed. Meanwhile, on the second placement surface portion 32B', an article to be inserted in the depth direction D, specifically, an article having a relatively large width and thus is incapable of being placed on the first placement surface portion 32A, for example, the tablet terminal is mainly placed. The article having a relatively small width, for example, the mobile phone or the non-contact IC card, may be placed on the second placement surface portion 32B'.

It is preferred that a vertically projected size of the second placement surface portion 32B' be equivalent to or smaller than a vertically projected size of the first placement surface portion 32A. This is because, when the vertically projected size of the second placement surface portion 32B' exceeds the vertically projected size of the first placement surface portion 32A, the width of the non-contact communication device is increased.

In the second embodiment, in particular, the second placement surface portion 32B' is retreated in the depth direction D with respect to the first placement surface portion 32A.

The retreat dimension in the depth direction D, that is, the dimension of the second placement surface portion 32B' in the depth direction D is determined in consideration of the following matters. That is, the article to be placed on the second placement surface portion 32B' is required to be reliably supported without dropping off, and the second antenna 23B' is required to be built into a range that enables establishment of the non-contact communication to/from any of various articles that may be placed on the second placement surface portion 32B'.

In the non-contact communication device according to the second embodiment, the second placement surface portion 32B' covering the first placement surface portion 32A like a roof or an eave is retreated in the depth direction D. Therefore, as compared to the non-contact communication device according to the first embodiment, it is easier to place or take out the article having the non-contact communication function on or from the first placement surface portion 32A. Further, in the non-contact communication device according to the second embodiment, as compared to the first embodiment, it is easier to visually confirm whether or not the article is placed at the correct placement position on the first placement surface portion 32A.

Further, a range in which the second antenna 23B' built into the second placement surface portion 32B' overlaps with the first antenna 23A built into the first placement surface portion 32A is reduced. Therefore, the influence of transmission or reception of radio waves can be suppressed as compared to the first embodiment.

The non-contact communication device according to the second embodiment operates similarly to the non-contact communication device of the first embodiment described with reference to FIG. 9.

When a relatively large article, for example, a tablet terminal, is placed on the second placement surface portion 32B', it is conceivable that, even when the user (who desires to pay for the fuel) thinks that the article is correctly placed, the antenna of the article is actually shifted in the depth direction D from the second antenna 23B', and normal non-contact communication cannot be established as a result.

Therefore, for example, referring to FIG. 9 used for the second embodiment as well, in Step S8, when there is no response from the article on the second placement surface portion 32B' with respect to the inquiry (No in Step S8), before returning to Step S2, the host device may output an alert sound, and a display of the host device may display a message like "No smart phone or IC card detected. Place the smart phone or IC card if not yet placed. Change the direction or position of the smart phone or IC card if already placed." Thus, the user is urged to perform the next action.

A part or all of the above-mentioned embodiments are described in the following supplementary notes, but are not limited to the following supplementary notes.

Supplementary Note 1

A non-contact communication device, comprising:
a placement portion on which an article having a non-contact communication function is to be placed; and
a non-contact communication unit configured to perform non-contact communication to/from the article placed on the placement portion,
the non-contact communication unit comprising a first connection interface and a second connection interface, which are each configured to be connected to the article in a non-contact manner,
the placement portion comprising:
a first placement surface portion, which forms a first angle that is smaller than 90 degrees with respect to a device width direction being a horizontal direction in front view, and to which the article to be inserted in a depth direction is to be placed; and
a second placement surface portion, which forms a second angle that is larger than the first angle and smaller than 90 degrees with respect to the device width direction, and to which the article is to be inserted in the depth direction to be placed, the first connection interface being built into the first placement surface portion, the second connection interface being built into the second placement surface portion, the second placement surface portion being positioned above the first placement surface portion and having a width that is larger than a width of the first placement surface portion.

Supplementary Note 2

The non-contact communication device according to Supplementary Note 1, wherein the second placement surface portion has a vertically projected size that is equal to or smaller than a vertically projected size of the first placement surface portion.

Supplementary Note 3

The non-contact communication device according to Supplementary Note 1 or 2, wherein the first angle comprises 0 degrees.

Supplementary Note 4

The non-contact communication device according to any one of Supplementary Notes 1 to 3, wherein the placement portion further comprises a space portion configured to receive the article inserted in the depth direction, and wherein the first placement surface portion and the second placement surface portion are formed in the space portion.

Supplementary Note 5

The non-contact communication device according to Supplementary Note 4, wherein the space portion is formed into a quadrangular shape having a base that is parallel to the device width direction in front view, wherein the first placement surface portion is formed on the base of the quadrangular shape, and wherein the second placement surface portion is formed on a diagonal line of the quadrangular shape.

Supplementary Note 6

The non-contact communication device according to any one of Supplementary Notes 1 to 5, wherein the second placement surface portion is retreated in the depth direction with respect to the first placement surface portion.

Supplementary Note 7

The non-contact communication device according to any one of Supplementary Notes 1 to 6, wherein the first placement surface portion comprises a recess capable of making contact with an outer shape of the article so that the article is guided to be placed at a correct placement position in the depth direction and in a width direction of the first placement surface portion, and so that the article is regulated from being deviated from the correct placement position.

Supplementary Note 8

The non-contact communication device according to any one of Supplementary Notes 1 to 7, in which the second placement surface portion includes a projection, which is provided to be projected from a placement surface on one of a right side and a left side, whichever has a lower height, of the second placement surface portion in a width direction thereof, and is capable of making contact with the outer shape of the article so that the article is guided to be placed at a correct placement position in the width direction of the second placement surface portion, and so that the article is regulated from being deviated from the correct placement position.

Supplementary Note 9

The non-contact communication device according to Supplementary Notes 1 to 7, wherein the non-contact communication unit is configured to determine on which of the first placement surface portion and the second placement surface portion the article is placed based on an attempt of the non-contact communication to/from the article, to thereby perform the non-contact communication to/from the article with use of the first connection interface or the second connection interface built into one of the first placement surface portion and the second placement surface portion, which is determined to have the article placed thereon.

Supplementary Note 10

The non-contact communication device according to any one of Supplementary Notes 1 to 8, wherein the non-contact communication unit further comprises a reader/writer configured to read out or write, when the article includes a recording medium configured to record data in a rewritable manner, data to/from the recording medium along with the non-contact communication to/from the article.

Supplementary Note 11

A payment device, comprising the non-contact communication device according to Supplementary Note 9, wherein the reader/writer of the non-contact communication unit is configured to read out or write value data to/from the recording medium along with the non-contact communication to/from the article.

Supplementary Note 12

The non-contact communication device according to any one of Supplementary Notes 4 to 10, in which the placement portion further includes a door, which is provided at an opening end of the space portion, and is capable of opening and closing the space portion.

Supplementary Note 13

The non-contact communication device according to Supplementary Note 12, in which the non-contact communication unit is configured to lock the door into a closed state during the non-contact communication to/from the article.

INDUSTRIAL APPLICABILITY

This invention has been described above with reference to the embodiments, but various modifications understandable to a person having ordinary skill in the art may be made to the configurations and details of this invention.

For example, this invention is not limited to a non-contact communication device to be used in association with payment devices such as an outdoor apparatus of a filling station or a cash register device of a shop, and is applicable to general non-contact communication devices configured to perform non-contact communication to/from articles having the non-contact communication function and being assumed to have various sizes.

REFERENCE SIGNS LIST 20, 20' non-contact communication unit
21, 21' controller
22A first reader/writer
22B second reader/writer
22' reader/writer
23A first antenna
23B, 23B' second antenna
24 communication interface section
25 antenna switcher
26 latch portion
30, 30' placement portion
31 space portion
32A first placement surface portion
322A recess
32B, 32B' second placement surface portion
322B, 322B' projection
35 door
352 pivot shaft
353 engagement portion
40 display with touch panel
50 banknote inputting device
60 credit card reading device
70 receipt printing printer
80 intercommunication device
100 outdoor apparatus (payment device)
600A mobile phone
600B tablet terminal
α first angle
β second angle

The invention claimed is:

1. A non-contact communication device, comprising:
a placement portion on which an article having a non-contact communication function is to be placed; and
a non-contact communication unit configured to perform non-contact communication to/from the article placed on the placement portion,
the non-contact communication unit comprising a first connection interface and a second connection interface, which are each configured to be connected to the article in a non-contact manner,
the placement portion comprising:
 a first placement surface portion, which forms a first angle that is smaller than 90 degrees with respect to a device width direction being a horizontal direction in front view, and to which the article is to be inserted in a depth direction to be placed; and
 a second placement surface portion, which forms a second angle that is larger than the first angle and smaller than 90 degrees with respect to the device width direction, and to which the article is to be inserted in the depth direction to be placed,
the first connection interface being built into the first placement surface portion,
the second connection interface being built into the second placement surface portion,
the second placement surface portion being positioned above the first placement surface portion and having a width that is larger than a width of the first placement surface portion.

2. The non-contact communication device according to claim 1, wherein the second placement surface portion has a vertically projected size that is equal to or smaller than a vertically projected size of the first placement surface portion.

3. The non-contact communication device according to claim 1, wherein the first angle comprises 0 degrees.

4. The non-contact communication device according to claim 1,
wherein the placement portion further comprises a space portion configured to receive the article inserted in the depth direction, and
wherein the first placement surface portion and the second placement surface portion are formed in the space portion.

5. The non-contact communication device according to claim 4,
wherein the space portion is formed into a quadrangular shape having a base that is parallel to the device width direction in front view,
wherein the first placement surface portion is formed on the base of the quadrangular shape, and
wherein the second placement surface portion is formed on a diagonal line of the quadrangular shape.

6. The non-contact communication device according to claim 1, wherein the second placement surface portion is retreated in the depth direction with respect to the first placement surface portion.

7. The non-contact communication device according to claim 1, wherein the first placement surface portion comprises a recess capable of making contact with an outer shape of the article so that the article is guided to be placed at a correct placement position in the depth direction and in a width direction of the first placement surface portion, and so that the article is regulated from being deviated from the correct placement position.

8. The non-contact communication device according to claim 1, wherein the non-contact communication unit is configured to determine on which of the first placement surface portion and the second placement surface portion the article is placed based on an attempt of the non-contact communication to/from the article, to thereby perform the non-contact communication to/from the article with use of the first connection interface or the second connection interface built into one of the first placement surface portion and the second placement surface portion, which is determined to have the article placed thereon.

9. The non-contact communication device according to claim 1, wherein the non-contact communication unit further comprises a reader/writer configured to read out or write, when the article includes a recording medium configured to record data in a rewritable manner, data to/from the recording medium along with the non-contact communication to/from the article.

10. A payment device, comprising the non-contact communication device according to claim 9,
wherein the reader/writer of the non-contact communication unit is configured to read out or write value data to/from the recording medium along with the non-contact communication to/from the article.

* * * * *